United States Patent
Yamashita et al.

(10) Patent No.: US 6,777,359 B2
(45) Date of Patent: Aug. 17, 2004

(54) POLARIZING GLASS AND PREPARATION METHOD THEREOF

(75) Inventors: Toshiharu Yamashita, Hachioji (JP); Yoshitaka Yoneda, Hamura (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/032,539

(22) Filed: Jan. 2, 2002

(65) Prior Publication Data

US 2003/0064875 A1 Apr. 3, 2003

(30) Foreign Application Priority Data

Sep. 21, 2001 (JP) .................................... 2001-289444

(51) Int. Cl.⁷ .............................................. C03C 3/093
(52) U.S. Cl. .............................. 501/67; 501/13; 501/66
(58) Field of Search ........................... 501/65, 66, 67, 501/74, 75, 76, 32, 56–59, 13, 77; 65/63, 102

(56) References Cited

U.S. PATENT DOCUMENTS

| | | | | |
|---|---|---|---|---|
| 3,540,793 A | * | 11/1970 | Araujo et al. ............... 359/241 |
| 3,833,511 A | * | 9/1974 | Yamashita et al. .......... 252/586 |
| 3,998,647 A | * | 12/1976 | Yamashita et al. ............ 501/13 |
| 4,304,584 A | | 12/1981 | Borelli et al. |
| 4,479,819 A | | 10/1984 | Borelli et al. |
| 4,746,633 A | * | 5/1988 | Mazeau et al. ................ 501/13 |
| 4,794,435 A | * | 12/1988 | Suzuki et al. ................ 351/163 |
| 4,891,336 A | * | 1/1990 | Prassas ........................ 430/197 |
| 5,023,209 A | * | 6/1991 | Grateau et al. ............... 501/13 |
| 5,252,524 A | | 10/1993 | Borelli et al. |
| 5,840,096 A | * | 11/1998 | Tajima et al. ................. 75/334 |

* cited by examiner

Primary Examiner—Karl Group
Assistant Examiner—Elizabeth A. Bolden
(74) Attorney, Agent, or Firm—Sughrue Mion, PLLC

(57) ABSTRACT

A polarizing glass comprising geometrically anisotropic particles dispersed in an oriented manner in at least the surface of a glass base body. The glass base body is denoted by the weight percentages of 50–65 percent $SiO_2$, 15–22 percent $B_2O_3$, 0–4 percent $Al_2O_3$, 2–8 percent $ZrO_2$, 6 percent $<Al_2O_3+ZrO_2<12$ percent, 6–16 percent $R_2O$ (where R denotes at least one from among Li, Na, and K), 0–3 percent $Li_2O$, 0–9 percent $Na_2O$, 4–16 percent $K_2O$, $Li_2O+Na_2O<K_2O$, 0–7 percent BaO and/or SrO, and 0–3 percent $TiO_2$. The glass base body comprises per 100 weight percent of essentially the above composition at least 0.15–1.0 percent Ag and at least the chemical equivalent to Ag of Cl and/or Br; and the geometrically anisotropic silver particles are metallic Ag particles. The polarizing glass is employed in optical products such as optical isolators.

8 Claims, 2 Drawing Sheets

POLARIZING GLASS AND PREPARATION METHOD THEREOF

BACKGROUND OF THE INVENTION

1. Field of the Invention

The present invention relates to polarizing glasses employed in optical products such as optical isolators, and more particularly, to high performance polarizing glasses comprising geometrically anisotropic metallic silver particles. The present invention further relates to methods of manufacturing these polarizing glasses.

2. Description of Related Art

Polarizing glasses comprising geometrically anisotropic metallic silver particles can be manufactured by the methods described in Japanese Patent Application Examined Publication No. Hei 2–40619 (Referenced publication 1) and Japanese Patent Application Un-examined Publication No. Sho 56-169140 (Referenced publication 2).

In these methods, glass comprising a silver halide is heat-treated to deposit out the silver halide and the glass is elongated to lengthen the silver halide particles. The glass is then heat treated in a reducing environment to reduce the silver halide particles to silver, thereby manufacturing polarizing glass comprising geometrically anisotropic silver particles.

For example, the following method is specifically described in Referenced publication 1.

A method of manufacturing glass articles exhibiting excellent polarization in the infrared region of the spectrum from glasses containing silver halide particles therein selected from the group of AgCl, AgBr, and AgI, characterized by comprising steps in which (a) a batch for a glass containing silver and at least one halide selected from the group of chloride, bromide, and iodide is melted and the melt shaped into a glass body of a desired geometry; (b) the glass body is subjected to a heat treatment at least above the strain point but not in excess of 50° C. above the softening point of the glass for a period of time adequate to cause the generation of AgCl and/or AgBr and/or AgI particles therein, said particles ranging in size between 200-5000 Å; (c) the glass body is elongated under stress at a temperature above the annealing point but below that where said glass exhibits a viscosity of about $10^8$ poises, such that the particles are elongated to an aspect ratio of at least 5:1; and (d) the elongated glass body is exposed to a reducing environment at a temperature between 250° C. and about 25° C. above the annealing point of the glass to reduce at least a portion of the silver halide particles in the glass to silver particles which is deposited in or on the elongated particles.

Referenced publications 1 and 2 disclose glasses employed in polarizing glass, for example, exhibiting photochromic characteristics and having a composition consisting essentially, expressed in terms of weight percent on the oxide basis, of 6–20 percent $R_2O$ (where $R_2O$ consists of 0–2.5 percent $Li_2O$, 0–9 percent $Na_2O$, 0–17 percent $K_2O$, and 0–6 percent $Cs_2O$), 14–23 percent $B_2O_3$, 5–25 percent $Al_2O_3$, 0–25 percent $P_2O_5$, 20–65 percent $SiO_2$, 0.004–0.02 percent CuO, 0.15–1.3 percent Ag, 0.1–0.25 percent Cl, and 0.1–0.2 percent Br, the molar ratio $R_2O:B_2O_3$ ranging between about 0.55–0.85 when the composition is essentially free from divalent metal oxides other than CuO, and the weight ratio Ag:(Cl+Br) ranging between about 0.65–0.95.

In such types of polarizing glasses, the silver halide that is reduced in the silver halide crystal reducing step is just the outer layer portion, with silver halide crystals being present in the glass matrix in large quantity. When the silver halide exhibits photochromic characteristics, exposure to ultraviolet or visible light causes darkening and absorption of near infrared light, compromising the polarization characteristics of the polarizing glass, and in particular, causing a significant transmission loss.

Thus, Referenced publication 1 discloses a molar ratio of $(R_2O—Al_2O_3):B_2O_3<0.25$ and essentially the absence of CuO in the above-recited composition exhibiting photochromic characteristics as a composition rendering polarizing glass non-photochromic.

Japanese Patent No. 2628014 (Referenced publication 3) discloses another type of non-photochromic polarizing glass. Referenced publication 3 points out the problem in Referenced publication 1 that, in the glass batch melt or during the heat treatment generating silver halide crystals, silver is reduced to a metallic state and silver halide crystals are not generated in the heat treatment the purpose of which is to generate silver halide crystals, and describes a non-photochromic, silver halide-comprising, polarizing glass composition in the form of a composition comprising essentially no silver and a quantity of $CeO_2$ adequate to effectively maintain the silver in the glass in an oxidized state. $CeO_2$ oxidizes silver, and is employed as an oxidizing agent for the silver in place of CuO, which is thought to cause photochromism, thereby preventing the development of photochromic characteristics.

In such polarizing glasses, it is extremely important to stabilize the glass because of the use of a heat treatment step to deposit silver halide. However, the above-recited composition of polarizing glass has drawbacks in that the glass is thermally unstable and the glass loses transparency during the course of the heat treatment, that is, a haze is generated in the glass as the result of the deposition of crystals other than silver halide crystals. As a result, light entering the polarizing glass is scattered and transmission loss increases. In recent years in particular, since higher extinction ratios and lower losses have been demanded of the polarizing glass employed in optical components in the field of optical communications and the like, the increase in transmission loss is a major problem.

Further, in the manufacturing of non-photochromic polarizing glass, the $CeO_2$ employed in Referenced publication 3 has the same oxidizing effect as CuO and effectively prevents the reduction of Ag, as indicated by the formulas given below. However, in methods adding an oxidizing agent such as CuO and $CeO_2$, the quantities added to prevent reduction of Ag in the course of melting the glass must be changed based on the melt environment and melt conditions. Further, $Cu^{2+}$, $Cu^+$, $Ce^{4+}$, and $Ce^{3+}$ ions coexist in the glass. Since the chemical equilibrium of these ions tends to vary with temperature, there is a risk that silver will be reduced to a metallic state in the subsequent heat treatment step used to form silver halides.

$2CuO<=>Cu_2O+O$  $2CeO_2<=>Ce_2O_3+O$

Even the further addition of $CeO_2$ does not fully prevent photochromism, but causes nucleation promoting the growth of deposits of undesirable crystals other than Ag halide crystals. This is problematic in that it increases transmission loss.

The present invention, devised in light of the above-described problems, has for its object to provide polarizing glass with low transmission loss and a high extinction ratio. A further object of the present invention is to provide a polarizing glass permitting the reduction of silver without the deposition of metallic silver in the heat treatment step for generating a glass melt and silver halide crystals essentially without the addition of oxidizing agents such as CuO and $CeO_2$.

SUMMARY OF THE INVENTION

The composition of photochromic glass is similar to that of the base glass employed in such polarizing glasses. The present inventors are the inventors of record of Japanese Patent Application Examined Publication No. Sho 56-51143 (Referenced Publication 4) disclosing the composition of photochromic glass comprising silver halide crystals for use in eyeglasses.

In glass for use in eyeglass lenses, there is the technical problem of conforming to the standard refractive index (Nd 1.523). Japanese Patent Application Examined Publication No. Sho 56-51143 describes the effectiveness, when incorporating refractive index raising components in the form of $TiO_2$ and $ZrO_2$, of keeping the quantity of $TiO_2$ low and incorporating $ZrO_2$ into a composition with little $Al_2O_3$, thereby yielding a thermally stable glass with a low liquidous temperature at a refractive index of 1.5 and above and better photochromic performance and chemical durability than compositions comprising large quantities of $Al_2O_3$.

The extinction ratios demanded of polarizing glass in optical components have been steadily increasing in recent years (for example, 40–50 dB or more at the chief wavelengths (center wavelengths of 1.31 µm and 1.55 µm) employed in the field of optical communications). In such high-performance polarizing glasses, the reduction of transmission loss is an extremely important problem. Accordingly, the present inventors employed means such as those described in above-cited Referenced publication 4 in the composition of the base glass of polarizing glass as well, discovering that the thermal stability of the glass was increased relative to the polarizing glasses disclosed in Referenced publications 1 and 2, preventing the scattering of incident light by avoiding the loss of transparency of glass due to heat treatment; that the optical scattering caused by differences in refractive index with silver halide crystals was reduced by increasing the refractive index of the glass; and finally, that when employed as polarizing glass, the transmission loss of incident light could be reduced. The present invention was devised on that basis.

Specifically, the present invention relates to a polarizing glass comprising geometrically anisotropic particles dispersed in an oriented manner in at least the surface of a glass base body, characterized in that the glass base body is denoted by the weight percentages of
50–65 percent $SiO_2$,
15–22 percent $B_2O_3$,
0–4 percent $Al_2O_3$,
2–8 percent $ZrO_2$,
6 percent $<Al_2O_3+ZrO_2<12$ percent,
6–16 percent $R_2O$ (where R denotes at least one from among Li, Na, and K),
0–3 percent $Li_2O$,
0–9 percent $Na_2O$,
4–16 percent $K_2O$,
$Li_2O+Na_2O<K_2O$,
0–7 percent BaO and/or SrO, and
0–3 percent $TiO_2$;
by comprising per 100 weight percent of essentially the above composition at least 0.15–1.0 percent Ag and at least the chemical equivalent to Ag of Cl and/or Br; and in that the geometrically anisotropic silver particles are metallic Ag particles.

Figure 1:
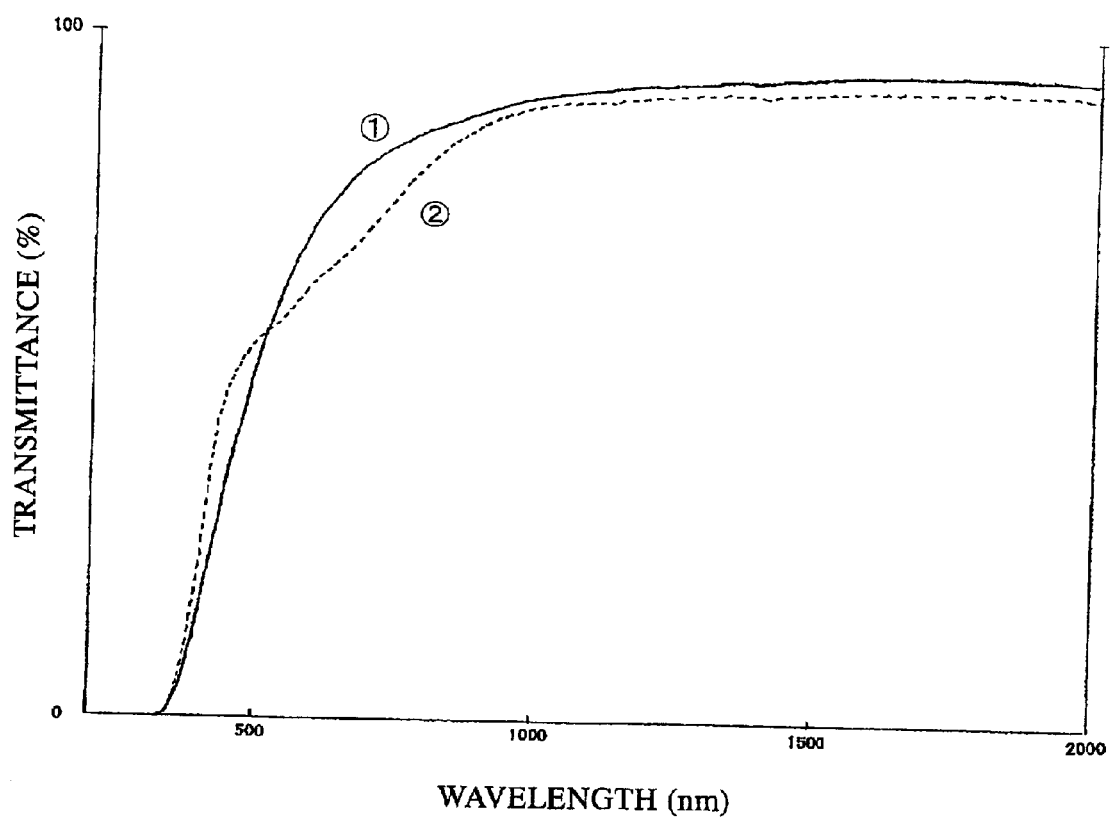
FIG. 1 is a spectral transmittance curve of the glass of Embodiment 1 following heat treatment (but prior to reduction) and the glass of Comparative Example 2 following heat treatment (prior to reduction).

The most characteristic aspects of the above-stated glass composition are the low quantity of $Al_2O_3$, the enhancement of the thermal stability of the glass by incorporation of $ZrO_2$, and the prevention of the deposition of undesirable metallic silver colloids during the heat treatments used to melt the glass and deposit silver halides.

The above-described glass becomes photochromic if 0.002–0.03 weight percent of CuO is doped, and non-photochromic glass if essentially no CuO is doped. When the incident light is in the visible range, photochromic characteristics are to be avoided because absorption due to photochromism results in insertion losses. When the incident light is in the infrared range, photochromic characteristics are normally not a problem; however, even slight absorption due to photochromism is thought to possibly affect the infrared range and is thus desirably avoided. In either case, photochromic characteristics have been unnecessary in polarizing glasses for optical components in recent years, with the lack thereof being desirable.

In non-photochromic polarizing glass, based on the glass of the present invention, even when an oxidizing agent such as CuO is not incorporated, reduction to metallic silver in the heat treatment step to melt the glass or generate silver halide may be fully prevented. This is because the base glass is highly basic. Thus, $K_2O$ is incorporated as an essential component in the present invention. Further, more $K_2O$ can be incorporated than $Li_2O+Na_2O$ to keep the glass highly basic. Preferably, an RO component (an alkaline earth metal oxide), particularly BaO, is further incorporated to render the base glass highly basic. Since $Cu^{2+}$ ions absorb near infrared radiation, it is possible to reduce transmission loss in the near infrared range by not incorporating CuO.

The composition of the polarizing glass of the present invention will be described in greater detail.

The $SiO_2$ content is 50–65 weight percent. A content of less than 50 weight percent is undesirable in that chemical durability deteriorates, and a content of greater than 65 weight percent is undesirable because melting becomes difficult. The preferred $SiO_2$ content is 55–62 weight percent.

The $B_2O_3$ content is 15–22 weight percent. A content of less than 15 weight percent is undesirable in that silver halide particles tend not to deposit, and a content of greater than 22 weight percent is undesirable in that the chemical durability of the glass deteriorates. The preferred $B_2O_3$ content range is 16–20 weight percent.

The $R_2O$ content is 6–16 weight percent. A content of less than 6 weight percent is undesirable in that melting becomes difficult, and a content of greater than 16 weight percent is undesirable in that silver halide particles tend not to deposit. R is at least one selected from among Li, Na, and K. The preferred $R_2O$ content is 8–12 weight percent. Further, the $Li_2O$ content is 0–3 weight percent, the $Na_2O$ content is 0–9 weight percent, and the $K_2O$ content is 4–16 weight percent, with $Li_2O+Na_2O<K_2O$. $Li_2O$ lowers the viscosity of the glass, enhancing melting properties. However, at greater than 3 weight percent, the glass itself tends to undergo phase separation and crystallize. $Na_2O$ may also be incorporated, but it must be kept to not greater than 9 weight percent to keep the glass basic. $K_2O$ is a useful component for increasing the basicity of the glass. However, the effect is weak and the viscosity of the glass increases at less than 4 weight percent, and silver halide particles tend not to deposit at greater than 16 weight percent. Further, making $Li_2+Na_2O<K_2O$ heightens the basicity of the glass.

The $Al_2O_3$ content is 0–4 weight percent and the $ZrO_2$ content is 2–8 weight percent.

When $Al_2O_3$ is greater than 4 percent, the thermal stability of the glass deteriorates in the combination with $ZrO_2$, and transparency tends to be lost. When the $ZrO_2$ content is less than 2 weight percent, chemical durability cannot be achieved in the combination with $Al_2O_3$ and no refractive index heightening effect is achieved. When the $ZrO_2$ content exceeds 8 weight percent, no thermal stability is achieved with respect to crystallization of the glass.

The total quantity of $Al_2O_3$ and $ZrO_2$ is greater than 6 weight percent and less than 12 weight percent. When the total quantity of $Al_2O_3$ and $ZrO_2$ is 6 weight percent or less, it is impossible to achieve glass with good chemical durability, and at 12 weight percent and above, the glass becomes unstable. Further, when $ZrO_2$ is incorporated instead of reducing the quantity of $Al_2O_3$, since the effect of $ZrO_2$ on preventing the reduction of silver is thought to be stronger than that of $Al_2O_3$, the preventive effect on the reduction of silver is thought to increase.

The $Al_2O_3$ content is desirably 1–3.5 weight percent, and the $ZrO_2$ content is desirably 4–7 weight percent. The combined quantity of $Al_2O_3$ and ZrO2 is desirably 7–10 weight percent.

Either one, or both, of BaO and SrO are desirably incorporated to increase the basicity of the glass. A content thereof exceeding 7 weight percent is undesirable in that silver halide particles tend not to deposit. To increase basicity and prevent the reduction of silver, holding BaO to 0.5–5 weight percent is particularly desirable.

Since $TiO_2$ contributes to increasing the refractive index of the glass and absorbs light of ultraviolet to short visible wavelengths that causes photochromism, it is incorporated with particular desirability when rendering the glass non-photochromic. In that case, a content exceeding 3 weight percent is undesirable in that it increases the crystallization tendency of the glass to lose transparency. The preferred $TiO_2$ content is 0.5–2 weight percent.

Ag is incorporated in a proportion of 0.15–1.0 weight percent per 100 weight percent of the above-stated composition comprised essentially of oxides. When the Ag content is less than 0.15 weight percent, the quantity of silver halide particles deposited decreases and a high extinction ratio is precluded. A content of greater than 1.0 weight percent is excessive, resulting in a high insertion loss, the deposition of silver halide particles in the glass during cooling following melting, and difficulty in controlling the size of the silver halide particles.

Since Cl and/or Br cause deposition of silver halide particles in the glass, a chemically equivalent quantity that is greater than the Ag dissolved as Ag ions is required. However, since it tends to volatize during melting of the glass, the chloride or bromide of an alkali metal or alkaline earth metal is added in excess as a supplement to incorporation as AgCl and AgBr. The quantity of Cl and/or Br added in excess differs based on the method of melting the glass and the scale, but is normally 0.3–0.6 weight percent.

Changes in the state of Ag in the process of manufacturing the polarizing glass of the present invention will be described below.

Ag is dispersed and melted in the form of $Ag^+$ ions into the base glass body. The base glass is heat treated so that the $Ag^+$, $Cl^-$, and $Br^-$ that have been dispersed and melted as ions into the base glass diffuse into the glass, the $Ag^+$ chemically bonds with the $Cl^-$ and $Br^-$ to form silver halide molecules, and these molecules then aggregate into silver halide particles and deposit out of the glass. Subsequently, when drawing (elongation) is conducted, the silver halide particles melt and form liquid droplets at the temperature at which the glass is drawn, and are readily elongated during elongation of the glass. Thus, elongated geometrically anisotropic silver halide is present in the drawn glass. Subjecting the glass following drawing to a reducing heat treatment in a hydrogen gas environment causes hydrogen atoms to diffuse into the glass, causing the surfaces of the solid-phase silver halide particles to be reduced while still retaining their geometrical anisotropy, with some or all of the $Ag^+$ ions becoming metallic silver particles. Accordingly, the quantity of Ag element in the glass body does not change before and after the reduction.

There is essentially no change in the composition following reduction with regard to the other components. However, some loss of Cl and Br in the form of HCl and HBr generated during the reduction reaction may occur.

The polarizing glass of the present invention comprises geometrically anisotropic particles that have been dispersed in an oriented manner in at least the surface layer of the glass body of the above-stated composition, and these geometrically anisotropic particles are metallic silver particles.

In the polarizing glass of the present invention, the layer comprising the geometrically anisotropic silver particles extends from the surface through part or all of the glass body. The thickness of this layer is 20–100 µm, for example. Further, the shape of the geometrically anisotropic particles is an ordinary slender spindle shape, the major axis of the geometrically anisotropic particles falls within the range of 300–1500 nm, for example, and the aspect ratio thereof ranges from 5–60, for example.

The method of manufacturing the polarizing glass of the present invention will be described next.

The glass is prepared within the ranges of the above-stated composition and melted by known methods. Subsequently, the glass is shaped and heat-treated and silver halide particles are deposited out. The heat treatment temperatures employed in these processes are greater than the yield temperature of the glass and less than the temperature at which the silver halide crystals remelt in the glass; these processes can be conducted at a temperature of about 600–950° C.

The glass is then drawn. However, prior to drawing, the preform is desirably polished and/or etched with an acid to shape the preform into a sheet for drawing. The predrawing polishing and/or etching is extremely effective in preventing breakage to the glass during drawing. Most preferably, both polishing and etching are performed in that order. Drawing can be conducted at temperatures at which the viscosity of the glass reaches $1\times10^{6-1\times10^{10}}$ poise. However, to elongate the silver halide particles without breakage the glass, drawing is preferably conducted at a temperature yielding a viscosity of greater than $2\times10^6$ and not greater than $7\times10^7$ poise. For the same reasons, the preferred stress during drawing is 50 $kg/cm^{2-600}$ $kg/cm^2$.

The elongated glass is heat treated in a reducing environment to reduce the silver halide in the surface layer of the glass. This heat treatment can be conducted at atmospheric pressure at a temperature of 350–460° C., for example, while maintaining a flow of hydrogen gas.

[Embodiments]

The present invention is further described below through embodiments.

Table 1 presents the embodiments of the present invention. The glass compositions, appearance of the glass following heat treatment to deposit silver halide crystals, and presence or absence of photochromism of glasses based on the related art disclosed in Japanese Patent Application Examined Publication No. Hei 9-2628014 (Referenced publication 3) and Japanese Patent Application Un-examined Publication No. Sho 56-169140 (Referenced publication 2) are given as Comparative Examples 1 and 2.

Thomson prism perpendicularly into the polarizing glass being measured, rotating the polarizing glass within a plane perpendicular to the optical axis, first measuring the minimum transmitted light intensity $P_1$, rotating the polarizing glass 90° and measuring the maximum transmitted light intensity $P_2$, and employing Equation (1) below. The loss was obtained by measuring the light intensity $P_0$ in the absence of polarizing glass and employing Equation (2) below.

$$\text{Extinction ratio } (dB) = -\text{Log}(P_1/P_2) \quad (1)$$

$$\text{Loss } (dB) = -\text{Log}(P_2/P_0) \quad (2)$$

TABLE 1

Embodiments and comparative examples of the present invention (components given as weight percentages)

| | Embodiment 1 | Embodiment 2 | Embodiment 3 | Embodiment 4 | Comp. Ex. 1 Referenced publication 3 No. 3, Table 1 | Comp. Ex. 2 Referenced publication 2 No. 10, Table 1 |
|---|---|---|---|---|---|---|
| $SiO_2$ | 59.1 | 57.5 | 61.0 | 59.1 | 56.3 | 58.6 |
| $B_2O_3$ | 18.1 | 20.5 | 17.2 | 18.1 | 18.1 | 18.3 |
| $Al_2O_3$ | 2.0 | 3.5 | — | 2.0 | 6.2 | 9.51 |
| $Li_2O_3$ | 1.8 | 1.8 | 2.2 | 1.8 | 1.8 | 1.86 |
| $Na_2O$ | — | — | 1.0 | — | 4.1 | 2.95 |
| $K_2O$ | 8.1 | 9.0 | 6.9 | 8.1 | 5.7 | 9.77 |
| BaO | 3.4 | 1.2 | 2.2 | 3.4 | — | — |
| $TiO_2$ | 1.5 | — | 2.0 | 1.5 | 2.3 | — |
| $ZrO_2$ | 5.9 | 6.5 | 7.5 | 5.9 | 5.0 | — |
| Ag | 0.3 | 0.4 | 0.4 | 0.3 | 0.22 | 0.32 |
| CuO | — | — | — | 0.016 | — | 0.016 |
| $CeO_2$ | — | — | — | — | — | — |
| Cl | 0.6 | 0.5 | 0.6 | 0.6 | 0.24 | 0.30 |
| Br | — | 0.3 | — | — | 0.20 | 0.15 |
| Heat Treatment | 760° C. 1 hr | 730° C. 2 hrs | 740° C. 5 hrs | 730° C. 8 hrs | 720° C. 2 hrs | 720° C. 20 min |
| Mean particle size | 100 nm | 95 nm | 100 nm | 113 µm | — | — |
| Appearance following heat treatment | Slightly opaque, translucent | Slightly opaque, translucent | Slightly opaque, translucent | Slightly opaque, translucent | Dark purple hazy, translucent | Dark purple hazy, translucent |
| Deposition of metallic silver | Absent | Absent | Absent | Absent | Present | Present |
| Deposition of crystals other than silver halide | Absent | Absent | Absent | Absent | Present (rutile $TiO_2$ crystals) | Absent |
| Photochromism | Absent | Absent | Absent | Present | Slight amount | Present |
| Elongation temperature | 685° C. | 675° C. | 695° C. | 685° C. | — | — |
| Elongation tension | 177 Kg/cm$^2$ | 200 Kg/cm$^2$ | 200 Kg/cm$^2$ | 177 Kg/cm$^2$ | | |
| Reduction heat treatment | 440° C. 16 hrs | 430° C. 8 hrs | 450° C. 4 hrs | 440° C. 16 hrs | — | — |
| Extinction ratio | | | | | | |
| 1.31 µm | 54 dB | 56 dB | 55 dB | 53 dB | | |
| 1.55 µm | 50 dB | 50 dB | 54 dB | 52 dB | | |
| Insertion loss | | | | | | |
| 1.31 µm | 0.04 dB | 0.03 dB | 0.03 dB | 0.04 dB | — | — |
| 1.55 µm | 0.04 dB | 0.03 dB | 0.03 dB | 0.04 dB | | |

In Table 1, the absence or presence of photochromism was determined by irradiating, with a 500 W xenon lamp at 50 cm for 10 min, glass that had been ground to a thickness of 2 mm following heat treatment, visually observing the change in color of the glass due to irradiation, and measuring the change in transmittance at a wavelength of 650 nm following irradiation.

The extinction ratio and insertion loss are values obtained by measurement of glass samples 0.2 mm in thickness having an anti-reflection coating to both surfaces.

The extinction ratio of the polarizing glass was obtained by creating a parallel beam of light with a fiber collimator from semiconductor laser beams of various wavelengths, directing this beam via a phase compensator and Grant When this polarizing glass is employed in an optical communication optical isolator, it is necessary to minimize Fresnel reflection on the surface. Thus, a reflection-reducing film is normally formed on the polarizing glass. An $SiO_2$/$TiO_2$/$SiO_2$ three-layered reflection-reducing film the thickness of which was designed to minimize reflectance at each of the wavelengths employed was formed on modified glass of the present embodiment. The reflectance was 0.1–0.2 percent on both surfaces.

Embodiment 1

Glass having the composition of Embodiment 1 in Table 1 was melted at about 1,450° C. in a five-liter platinum crucible, poured into a mold, and gradually cooled at 530° C. to produce a mother glass block. Commonly employed optical glass starting materials in the form of the oxides $SiO_2$, $TiO_2$, and $ZrO_2$ as well as compounds such as $H_3BO_3$, $Al(OH)_3$, $Li_2CO_3$, $Na_2CO_3$, $NaNO_3$, $K_2CO_3$, $KNO_3$, $BaCO_3$, and $Ba(NO_3)_2$, and silver and chlorine starting materials such as $Ag_2O$, AgCl, NaCl, KCl, and $BaCl_2$, can be employed as glass starting materials.

The glass block was then cut to about 70×230×10 mm, placed in a mold of refractory material, and heat treated in an electric furnace for 1 hr at 760° C., a temperature 60° C. higher than the softening point of the glass, yielding glass in which silver chloride crystal particles had deposited. Observation by transmission electron microscopy revealed the average particle size of the silver chloride that had deposited out to be 110 nm. Glass that was colorless and transparent prior to the heat treatment developed white haze and become translucent due to the deposition of silver chloride crystals following the heat treatment. However, as indicated by plot (1) of the spectral transmittance curve (2 mm in thickness) of FIG. 1, absolutely no absorption or coloration due to the deposition of reduced silver colloids was observed. Further, only diffraction pattern of silver chloride crystals were observed in the X-ray diffraction pattern of glass with an average particle size of 133 nm that had been subjected to an excessive heat treatment for 8 hr at 750° C., confirming that no crystals other than silver chloride had deposited out.

This heat-treated glass slab was processed into the form of a sheet measuring about 60×220×2 mm and subjected to polishing. The sheet was then etched for 5 min with a mixed solution of hydrofluoric acid and sulfuric acid to remove scratches from the surface, yielding sheet-shaped preforms for elongation.

These preforms were loaded into the feeder of an elongation device equipped with both a preform feeding mechanism and pulling mechanism in the top and bottom portions of an electric furnace, a 100 g weight was attached, and heating was conducted once the front edge of the preform had been positioned slightly below the center of the furnace where the highest temperatures are reached. The temperature was increased to 685° C., corresponding to a glass viscosity of $8\times10^7$ poise, and maintained at that level for about 30 min, at which time the front edge portion of the preform softened. The neck dropped down, dropping out of the opening at the bottom of the furnace. This was gripped by pulling rollers equipped with a motor drive mechanism and pulling was begun. Elongation was conducted at a preform feed rate of 25 mm/min and a pull rate of 0.4 m/min, continuously yielding about 1.5 m of ribbon-shaped glass measuring about 15×0.47 mm in cross section. The pull load during elongation as measured with a load cell was 12.5 Kg, and the elongation tension obtained by division by the cross-section surface area of the ribbon was 177 Kg/cm$^2$.

Figure 2:
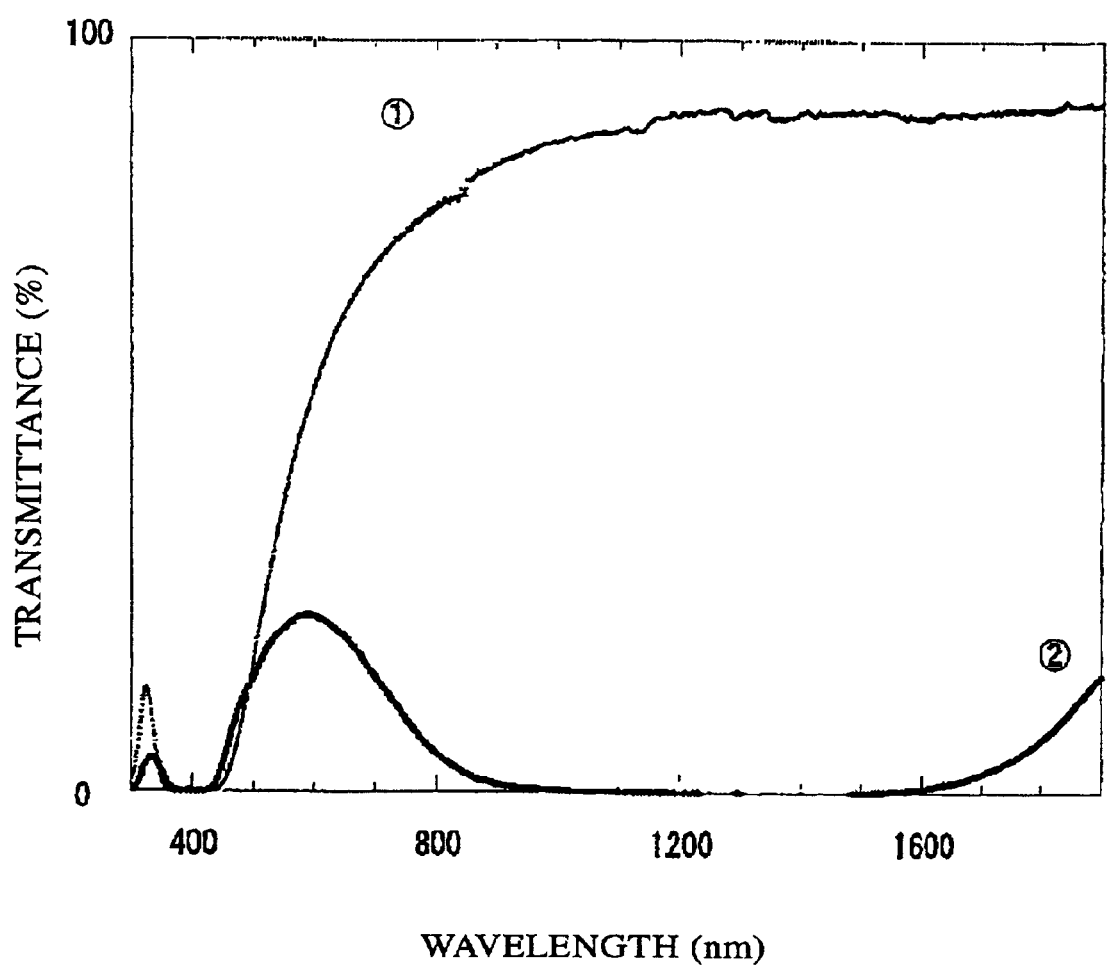
FIG. 2 is a spectral transmittance curve of the polarizing glass obtained in Embodiment 1.

The elongated glass ribbon was cut into a short tabular shape about 65 mm in length, both surfaces were ground to a thickness of 0.2 mm, and under a hydrogen gas flow, a reducing heat treatment was conducted for 16 hr at 430° C. The transmittance curve of the glass obtained is shown in FIG. 2. Plot (1) is the case where polarizing light was introduced in parallel to the polarizing transmission axis and plot (2) is the case where polarizing light was introduced perpendicular to the transmission axis, with the absorption peak wavelength of plot (2) being about 1.27 $\mu$m. Further, observation by transmission electron microscopy revealed the mean aspect ratio of the elongated particles to be about 14. Reflection-reducing films for 1.31 $\mu$m and 1.55 $\mu$m were formed on both surfaces of the glass and the extinction ratio and insertion loss were measured at each of the wavelengths, yielding values of 54 dB and 0.04 dB, and 50 dB and 0.04 dB, respectively.

Glass that was manufactured with an elongation load that had been increased to 14 Kg (a tension of 197 Kg/cm$^2$) but otherwise under the same conditions as those set forth above had a peak absorbance wavelength of 1.48 $\mu$m, an aspect ratio of 17, an extinction ratio of 52 dB and an insertion loss of 0.04 dB at a wavelength of 1.31 $\mu$m, and an extinction ratio of 56 dB and an insertion loss of 0.04 dB at a wavelength of 1.55 $\mu$m.

Embodiments 2–4

Embodiments 2 and 3 had different compositions than Embodiment 1. In Embodiment 4, 0.016 weight percent of CuO was added to Embodiment 1. Using the same procedure as in Embodiment 1, polarizing glasses were manufactured from these glasses under the same conditions as in Embodiment 1. All the glasses had good polarizing characteristics in the form of extinction ratios of not less than 50 dB and insertion losses of not greater than 0.05 dB.

For all of these glasses, absolutely no reduced metallic silver or deposited crystals other than silver halide crystals were observed either in the melt or in the glass following the heat treatment to deposit silver halide crystal particles.

Further, although Embodiment 4, comprising a trace quantity of CuO, was sensitive to ultraviolet radiation, darkened, and exhibited photochromism, Embodiments 2 and 3 had no optical sensitivity and were non-photochromic in the same manner as Embodiment 1.

Based on these embodiments, so long as no CuO is comprised in the glass of the present invention, no silver ions are reduced to metallic silver, depositing out and lowering transmittance (causing coloration), and no crystals other than silver halide crystals deposit out. That is, the factor causing the deterioration of polarization characteristics in polarizing glass has been eliminated.

COMPARATIVE EXAMPLES 1 AND 2

Glasses of the composition of Embodiment No. 3 of Table 1 in Japanese Patent Application Examined Publication No. Hei 9-2628014 (Referenced publication 3) comprising large amounts of $Al_2O_3$ and $ZrO_2$ but no BaO (Comparative Example 1), and of the composition of Embodiment No. 10 of Table 1 in Japanese Patent Un-examined Publication No. Sho 56-169140 (Referenced publication 2) comprising no BaO (Comparative Example 2) were prepared. Photochromism and the appearance of the glasses following heat treatment to cause deposition of silver halide crystals were compared with those of the glasses of the present application.

As set forth in the Specification section, reduced metallic silver and rutile crystals deposited out in addition to silver halide crystals in the glass of Embodiment No.3 of Japanese Patent Publication No. Hei 9-2628014 due to a heat treatment for 2 hr at 720° C. As a result, the glass exhibited dark purple haze and slight photochromism. The glass of Referenced publication 3 comprised essentially no copper, was non-photochromic, and was characterized by comprising an amount of $CeO_2$ adequate to effectively maintain the silver in an oxide state within the glass. This can be interpreted to mean that in a composition comprising more $Al_2O_3$ than in the present invention, no BaO, and little $K_2O$, the content of $CeO_2$ is essential to maintaining the silver in an oxide state in the glass.

Embodiment No. 10 of Referenced publication 2 is a photochromic glass comprising CuO. However, despite the incorporation of CuO, the glass exhibited a dark purple coloration similar to that of Comparative Example 1 when heat treated for 20 min at 720° C. and a lowered transmittance over a broad wavelength range as shown in plot (2) of FIG. 1. This indicates that silver tends to be reduced in glasses comprising large quantities of $Al_2O_3$.

In the above-described embodiments, polarization characteristics are described for the wavelength range of 1.3–1.6 μm that is principally employed in optical communication. However, since the factor causing deterioration of polarization characteristics has been eliminated in the present invention, it is clearly effective at other wavelengths. For example, it can be suitably applied to the polarizers employed in optical isolators for 0.98 μm light source for excitation of an optical amplifier.

Based on the present invention, polarizing glass can be manufactured in which metallic silver and crystals other than silver halide causing deterioration of polarizing characteristics such as the extinction ratio and insertion loss do not deposit out, and having good polarizing characteristics (for example, an extinction ratio of not greater than 50 dB and an insertion loss of not greater than 0.5 dB at a center wavelength of 1.31 μm and/or 1.55 μm) due to being non-photochromic. Further, since it is possible to prevent the deposition of metallic silver without employing $CeO_2$, with its unstable effect as a silver oxidizing agent and promotion of the growth of deposits of crystals other than silver halide that function as nucleating agents, high-performance polarizing glass can be stably and reliably manufactured.

The present disclosure relates to the subject matter contained in Japanese Patent Application No. 2001-289444 filed on Sep. 21, 2001, which is expressly incorporated herein by reference in its entirety.

What is claimed is:

1. A polarizing glass comprising geometrically anisotropic particles dispersed in an oriented manner in at least the surface of a glass base body,
wherein the glass base body is denoted by the weight percentages of
50–65 percent $SiO_2$,
15–22 percent $B_2O_3$,
0–4 percent $Al_2O_3$,
2–8 percent $ZrO_2$,
6 percent <$Al_2O_3+ZrO_2$<12 percent,
6–16 percent $R_2O$ (where R denotes at least one from among Li, Na, and K),
0–3 percent $Li_2O$,
0–9 percent $Na_2O$,
4–16 percent $K_2O$,
$Li_2O+Na_2O<K_2O$,
0–7 percent BaO and/or $SrO_3$, and
0–3 percent $TiO_2$;
comprises per 100 weight percent of essentially the above composition at least 0.15–1.0 percent Ag and at least the chemical equivalent to Ag of Cl and/or Br; and the geometrically anisotropic silver particles are metallic Ag particles, and said glass substantially does not comprise CuO and $CeO_2$.

2. The polarizing glass according to claim 1 wherein the glass comprises 0.5–5 weight percent BaO.

3. The polarizing glass according to claim 1 wherein the glass substantially does not exhibit photochromic characteristics.

4. The polarizing glass according to claim 1 wherein the glass comprises 1–3.5 weight percent $Al_2O_3$.

5. The polarizing glass according to claim 1 wherein the glass comprises 4–7 weight percent $ZrO_2$.

6. The polarizing glass according to claim 1 wherein the glass comprises 7–10 weight percent $Al_2O_3$ and $ZrO_2$.

7. A process for preparation of a polarizing glass comprising steps of;
heat treating a shaped glass having the composition denoted by the weight percentages of
50–65 percent $SiO_2$,
15–22 percent $B_2O_3$,
0–4 percent $Al_2O_3$,
2–8 percent $ZrO_2$,
6 percent <$Al_2O_3+ZrO_2$<12 percent,
6–16 percent $R_2O$ (where R denotes at least one from among Li, Na, and K),
0–3 percent $Li_2O$,
0–9 percent $Na_2O$,
4–16 percent $K_2O$,
$Li_2O+Na_2O<K_2O$,
0–7 percent BaO and/or SrO, and
0–3 percent $TiO_2$;
comprising per 100 weight percent of essentially the above composition at least 0.15–1.0 percent Ag and at least the chemical equivalent to Ag of Cl and/or Br to deposit out silver halide particles, and said glass substantially does not comprise CuO and $CeO_2$;
drawing the glass to elongate the silver halide particles in the glass; and
reducing at least part of the elongated silver halide particles in the glass to form geometrically anisotropic silver particles.

8. The process for preparation of claim 7 wherein the shaped glass is polished and/or etched.

* * * * *